United States Patent [19]
Dorey et al.

[11] Patent Number: 5,237,328
[45] Date of Patent: Aug. 17, 1993

[54] PROTECTION SYSTEM FOR ELECTRONIC EQUIPMENT

[75] Inventors: Jacques Dorey, Combs la Ville; Claude Chekroun, Gif S/Yvette, both of France

[73] Assignee: Thomson-CSF Radant, Les Ulis, France

[21] Appl. No.: 813,707

[22] Filed: Dec. 27, 1991

[30] Foreign Application Priority Data

Dec. 27, 1990 [FR] France ............................... 90 16333

[51] Int. Cl.⁵ .............................................. G01S 7/36
[52] U.S. Cl. ........................................ 342/13; 342/16
[58] Field of Search ................................... 342/13, 16

[56] References Cited

U.S. PATENT DOCUMENTS

| | | |
|---|---|---|
| 3,708,796 | 1/1973 | Gilbert . |
| 4,212,014 | 7/1980 | Chekroun . |
| 4,320,404 | 3/1982 | Chekroun . |
| 4,344,077 | 8/1982 | Chekroun et al. . |
| 4,447,815 | 5/1984 | Chekroun et al. . |
| 5,001,495 | 3/1991 | Chekroun . |

FOREIGN PATENT DOCUMENTS

| | | |
|---|---|---|
| 0000308 | 10/1979 | European Pat. Off. . |
| 3642072 | 6/1988 | Fed. Rep. of Germany . |
| 3744511 | 7/1989 | Fed. Rep. of Germany . |

*Primary Examiner*—T. H. Tubbesing
*Attorney, Agent, or Firm*—Pollock, VandeSande & Priddy

[57] ABSTRACT

This invention concerns a system to protect active or passive electronic equipment from radar detection. In other words equipment which transmits or receives microwave radiation, for example a radar or telecommunications transmitter or receiver.

For this purpose, the transmitting surface of the equipment is covered by a device which can be controlled to apply a phase shift of approximately $\pi/2$ to the incident wave; this enables a microwave incident on the equipment to be modulated in phase. The frequency spectrum of the wave reflected by the equipment is modified and spread thus making it more difficult to detect the equipment. To avoid any perturbation of the operation of the equipment, an inverse modulation is applied to signals transmitted and/or received by the equipment itself.

13 Claims, 4 Drawing Sheets

PROTECTION SYSTEM FOR ELECTRONIC EQUIPMENT

BACKGROUND OF THE INVENTION

This invention concerns a system to protect active or passive electronic equipment from radar detection, in other words equipment which transmits or receives microwave radiation, for example a radar or telecommunications transmitter or receiver.

Equipment such as those equipped with antennas, strongly reflect microwaves and, consequently, are easily detected by radar. There exist different devices which absorb to a certain degree an incident microwave, or which, more generally, mask the potential target from a radar beam. However, such devices, often with a very limited efficiency, cannot generally be used to protect electronic equipment, as they perturb both transmission and reception.

SUMMARY OF THE INVENTION

This invention relates to a system to ensure the protection of electronic equipment without causing functional perturbation.

For this purpose, the transmitting and/or receiving surface is covered with a device which can be commanded to induce a given phase shift, for example, approximately $\pi/2$, which enables a microwave incident on the equipment to be modulated in phase; the wave reflected by the equipment has its frequency spectrum modified and spread, making it more difficult for the radar to detect the equipment. In order not to cause functional perturbation in the protected equipment, an inverse modulation is applied to the signal transmitted and/or received.

BRIEF DESCRIPTION OF THE DRAWINGS

Other purposes, characteristics and results of the present invention will appear on reading the following description, with reference to the drawings in which.

The same reference numbers are used in all these figures to refer to the same elements.

DESCRIPTION OF THE PREFERRED EMBODIMENT

Figure 1:
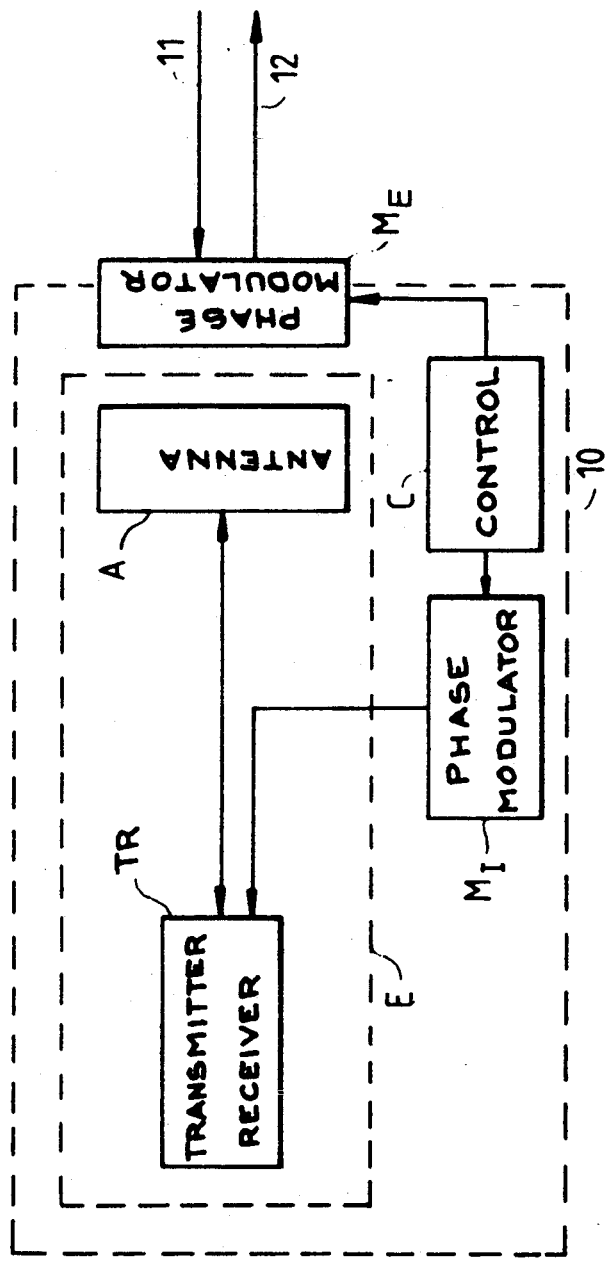
FIG. 1 represents a block diagram of the device according to the invention.

FIG. 1 is a block diagram of the device according to the invention.

This figure illustrates the equipment E requiring protection, for example comprising a transmitter/receiver assembly TR, connected to an antenna A used to transmit and receive microwave electromagnetic radiation commanded by the TR assembly. The equipment E may be a radar, for example.

According to the invention, the transmitting and/or receiving surface of the equipment E, in all cases at least the antenna A surface, is covered with the means $M_E$ forming a phase modulator and enabling, on commands from the control system C, a shift of approximately $\pi/2$ to be communicated to an incident microwave signal 11. The incident wave 11 may originate from an external radar, trying to detect the appliance carrying equipment E. As is known, part of this wave 11 is reflected by antenna A; it crosses back through the modulator $M_E$ and undergoes a further shift of $\pi/2$ and forms the reflected wave 12; the wave 12 has now been shifted in relation to the incident wave 11. In this way, when controlling the modulator $M_E$ a modulation of phase $0-\pi$ can be communicated to an external radar wave. Furthermore, this phase shift can be applied at any frequency f and, generally speaking, according to any variation law which in practice is only limited by the switching time of the modulator $M_E$. It should be noted for complete information, that the modulating frequency f of the modulator $M_E$ must remain sufficiently low to allow the wave 11 to see the same modulator $M_E$ phase state on the outward and return path (after reflection), which in practice is not a constraint. For example, the frequency f may be in a range of several megahertz.

Moreover, as the microwave energy transmitted or received by the equipment E has itself been phase modulated by the device $M_E$, the invention provides for a second phase modulator $M_I$, commanded in synchronization with the modulator $M_E$ by the means C. The modulator $M_I$ serves to compensate the modulation caused by the device $M_E$, in other words to apply to the signal transmitted or received by the assembly TR a phase modulation identical but opposite to that of the phase modulation applied by the modulator $M_E$ to the microwave transmitted or received by antenna A.

The modulator $M_I$ can be constructed in any known manner. For example, phase modulation can be generated at the output of a local oscillator, generally to be found in this type of equipment, whose signal is mixed with the signal transmitted or received by the equipment.

In a variant of this embodiment, illustrated by the dotted line 10 in FIG. 1, the phase modulator $M_E$ can surround the complete assembly E requiring protection.

Figure 2:
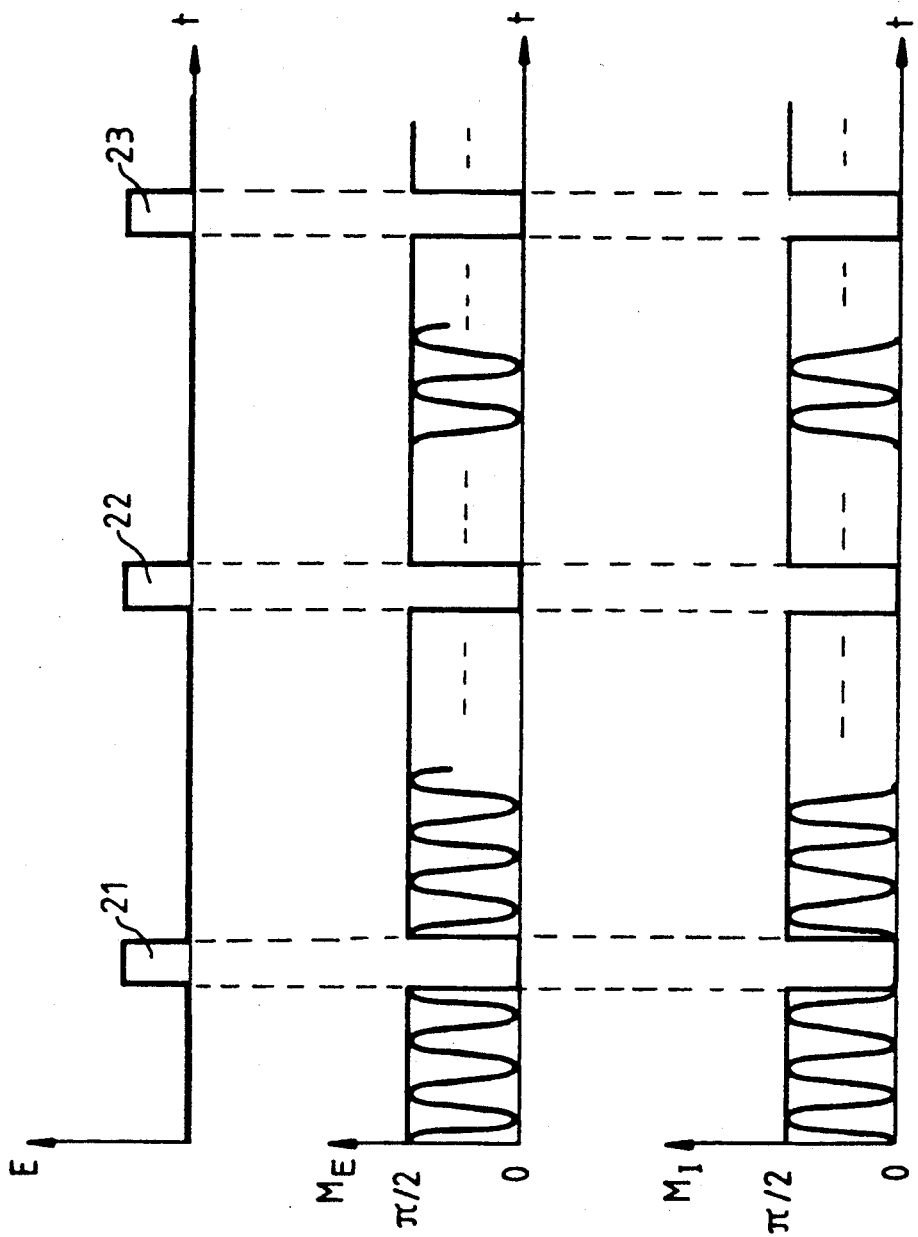
FIGS. 2a, 2b, and 2c represent timing diagrams of a first operating mode of the device, according to the invention.

The FIGS. 2a and 2b are timing diagrams representing a first operating mode of the device according to the invention.

FIG. 2a represents an example of the type of signal likely to be supplied by the assembly TR in FIG. 1 when a signal is transmitted by antenna A. It may consist of a series of pulses, marked 21, 22 and 23 at equal distances in time, modulating a microwave signal, not represented for reasons of clarity.

FIG. 2b represents the modulation law applied to a wave crossing the modulator $M_E$, whether it is a wave to be received by the antenna A or transmitted by the antenna A or the reflection of an incident wave on the antenna A. We see that the phase modulation varies periodically between 0 and $\pi/2$, for example sinusoïdally with a frequency f. This modulation is applied continuously except during the instants which corresponds to the transmission of pulses 21, 22 and 23.

FIG. 2c represents the modulation applied by the phase modulator $M_I$ to the signal transmitted by the antenna A towards the assembly TR or vice versa. In this case the modulation is periodic with the same frequency f between O and $\pi/2$ but is the inverse of the preceding modulation, in other words with a phase difference of $\pi$; this modulation, as in the case of the modulator $M_E$, is continuous except during the transmission period of pulses 21, 22 and 23.

The system operates in the following way:

When the equipment E transmits a pulse (21-23), this crosses the modulator $M_E$ without the latter applying any modulation.

The microwave incident on the equipment between pulses 21-23, for example echoes of pulses transmitted by itself, undergoes a phase modulation of $0-\pi/2$ applied by the modulator $M_E$ as shown in FIG. 2b.

This modulation is compensated by the inverse modulation applied by the modulator $M_I$ to the signal destined for the assembly TR, as shown in FIG. 2c. In this way, the signal received by the equipment E in the form of an echo of its transmissions is not perturbed either on transmission or reception.

As regards the microwaves which do not concern the operation of the equipment E, the modulator $M_E$ applies to them, outside the periods of transmission of pulses 21 . . . 23, a phase modulation of $0-\pi/2$; the part of this incident energy which is reflected by the antenna A crosses back through the modulator $M_E$ and undergoes a second phase shift, after which the wave 12 reflected by the system has a phase modulation of $0-\pi$.

This type of modulation has various effects on the external radar having transmitted a wave such as 11-12: first, it spreads the spectrum of the reflected wave in relation to that of the incident wave; the external radar having transmitted the wave at a frequency $F_O$ can only operate in a relatively narrow band around this frequency; the energy it receives in this band is found to be significantly lower than the energy that would have been received without modulation. Furthermore, if the modulation frequency (f) is sufficiently high, the maxima induced by the phase modulation would be outside the radar band limits; in this case, the echoed signal received by the radar operating at frequency $F_O$ becomes so weak that it appears as noise and cannot be detected. In addition, this modulation at frequency f which is unknown to the radar having transmitted the wave at frequency $F_O$, completely changes the echo characteristic of the equipment E and its vehicle, which reduces further the possibility of the latter being detected by radar - even if the radar power is increased to compensate for these protective measures.

The above description is given for a periodic variation at frequency f (sinusoidal, for example) of the diode control current. Other types of variation may of course be used, such as the control of diodes using random variations which result in an even more pronounced decharacterization of the radar echo.

Figure 3:
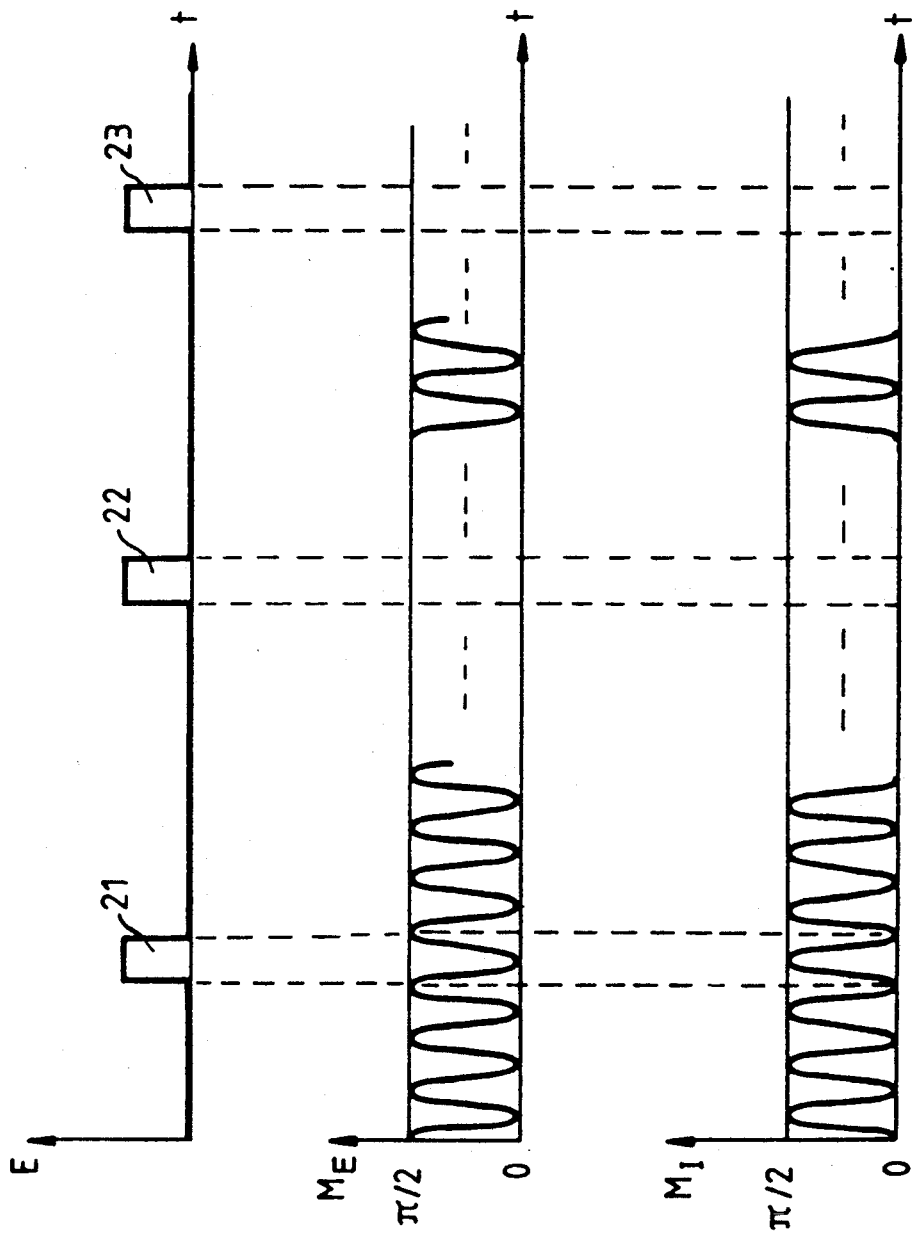
FIGS. 3a, 3b, and 3c represent timing diagrams of a second operating mode of the device, according to the invention.

FIGS. 3a, 3b and 3c are timing diagrams analogous to those in FIGS. 2a, 2b and 2c, representing a second operating mode of the device according to the invention.

FIG. 3a is identical to the FIG. 2a and represents the transmitting periods of the equipment E.

FIG. 3b represents the phase modulation applied to a microwave by modulator $M_E$. As in the previous case, and by way of example, the modulation is periodic, for example sinusoidal, and varies from 0 to $\pi/2$ at frequency f.

However, unlike the previous case, this modulation is continuous, in other words, modulation is effective even during the transmission periods 21 to 23.

FIG. 3c represents the modulation of modulator $M_I$. As previously, this modulation is the opposite of that of modulator $M_E$, in this case the modulation is periodic varying from 0 to $\pi/2$ at frequency f and is continuous.

The system operates in the following way:

As regards transmissions (21-23) from equipment E, the signal generated by the assembly TR is premodulated by the modulator $M_I$, whose modulation is compensated by the inverse modulation applied by the modulator $M_E$ to the wave transmitted by the antenna A.

During reception of signals originating in the equipment E by this equipment, the system operates in the same way as that described in FIGS. 2a-2c the wave is modulated before being received by the antenna A (modulator $M_E$), and this is compensated after the antenna by the modulator $M_I$. Therefore, as previously, the signal from the equipment E suffers no perturbation either on reception or on transmission.

During reception of signals not originating in the equipment E, the system functions in the same way as in FIGS. 2a-2c, to the extent that it remains operative continuously.

Figure 4:
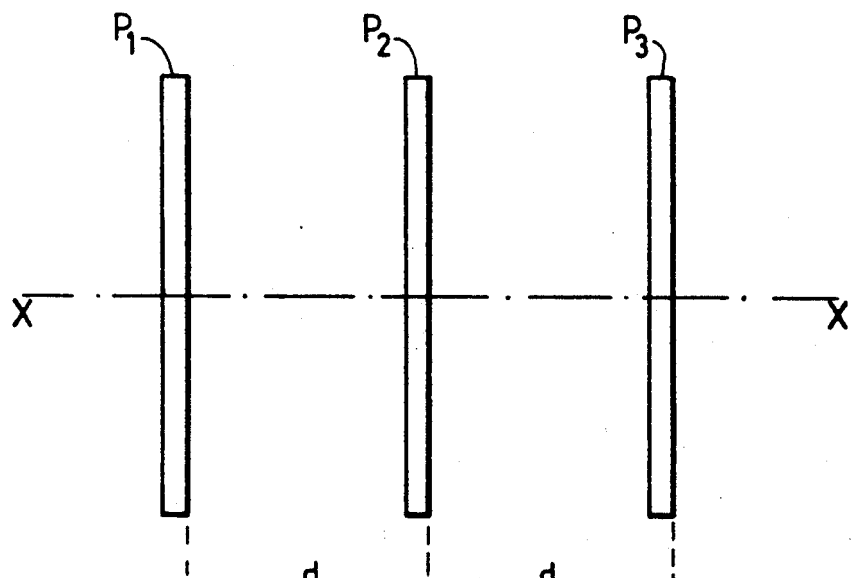
FIGS. 4 and 5 represent an embodiment of the phase shifting means used in the device according to the invention.

FIG. 4 represents an embodiment of the phase modulator $M_E$ used in the device according to the invention.

French patents 69.35239 and 77.19365 describe the dielectric panels equipped with switchable elements (diodes) to allow controlled phase shifting of a microwave signal.

The modulator in FIG. 4 belongs to this family of devices. It consists of three panels $P_1$, $P_2$ and $P_3$, mounted substantially parallel to each other on an axis XX which for example corresponds to the axis of the antenna A (FIG. 1). These panels are at a distance d from each other.

Figure 5:
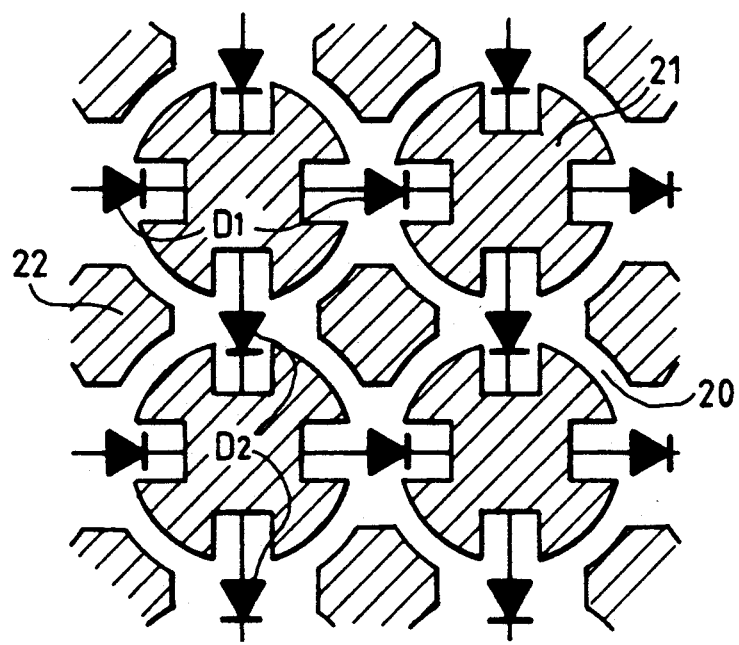

FIG. 5 is a partial view of a practical embodiment of one of the panels $P_1 \ldots P_3$.

This panel is made of a electrically insulating substrate 20, equipped with a plurality of semiconducting elements; in this embodiment, the substrate has two diode networks. The first network consists of diodes, marked $D_1$, all connected in the same direction in order to form a series of parallel lines. The second network consists of diodes $D_2$, all connected in the same direction to form columns substantially perpendicular to the previous lines. Conducting chips 21, disk-shaped for example, are located at the intersections of the lines and columns. Line spacing can be substantially equal to column spacing of a value of approximately $\lambda/2$, where $\lambda$ is the average wavelength of the modulator operating bandwidth; spacing of diodes $D_1$ and $D_2$ is constant within the lines or columns and can advantageously be the same for the lines and columns, thus forming a square grid. For reasons of clarity, the disks 21' are shown hatched, although they are not in fact viewed in section. Conductors (not shown), placed on the edge of the panel to interconnect the disks 21 provide the polarization of diodes $D_1$ and $D_2$.

The function of the disks 21' is to provide impedance matching for the panel. It is to be noted that they are represented as circular disks with notches for diode connection but they can be shaped differently (ring, cross, surfaced with cut-outs, etc . . . ), the actual shape being defined experimentally to improve the impedance matching of the panel. In this embodiment conducting patches 22' have been placed between the disks 21' to complete matching.

In a variant of this embodiment the two diode networks are placed one on each side of the substrate 20, in which case the diodes $D_1$ are no longer connected to diodes $D_2$ but controlled synchronously. This embodiment simplifies the diode supply problem.

This three-panel assembly operates depending on whether or not the incident wave is in its working frequency band, which must be substantially that of the equipment E.

Within this band, the modulator is readily matched and therefore imposes no reflection on the incident wave, especially on waves going to or coming from the equipment E. The modulator in this case presents two operating modes, depending on the state of the diodes, between which there is a shift close to 90°:

in a first state, the three-panel assembly diodes are conducting, in other words polarized directly by a large current (near saturation);

in the second state, the diodes are not conducting, but blocked by a reverse bias.

The geometric and electric characteristics of the panels (line and column spacing, diode spacing, shapes and dimensions of chips and patches, electrical characteristics of diodes, etc) are defined so that, at the average wavelength in the operating band:

in one of the diode states (blocked for example), if the panel $P_1$ has a susceptance B, the panel $P_3$ has the same susceptance B and the panel $P_2$, twice the susceptance (2B);

in the other diode state (conducting state) the susceptance of all the panels is zero.

The susceptance value B is defined by the value $\phi_o$ of the differential phase shift required between the two above-mentioned states, based on the following equation:

$$B = 2 \tan(\phi_o \cdot 1/(n+1))$$

where n is the number of panels.

The distance (d) between panels is given by the following expression:

$$d = (\lambda/2\pi) \cdot \operatorname{Arctan}(2/B)$$

However, through calculation and experimentation it has been shown that the operation of the device remains satisfactory for a wide range of values around the value given above: for example, a factor of 2 applied to the distance d calculated above remains acceptable.

By using at least three substantially equidistant panels $P_1$, $P_2$, $P_3$ with respective susceptances B, 2B and B, it is possible to obtain a matched device with two states, between which there is a differential phase shift $\phi_o$, for which a choice of value also determines that of B and, moreover, the configuration of each panel. For example, the value of $\phi_o$ is equal to 90° when the value of B is close to 0.8.

In a variant of the embodiment, the three panels $P_1$, $P_2$, $P_3$ can be moulded into a dielectric material such as foam, acting notably as a mechanical support. In this case, the distance expression d is to be corrected by the factor $\epsilon^{\frac{1}{2}}$, where $\epsilon$ is the dielectric constant of the material.

The modulator $M_E$ can include more than three panels provided that the following panel susceptance sequence is respected: a first and last panel each with susceptance B, separated by n−2 panels with susceptance 2B; by multiplying the number of panels the modulator bandwidth is enlarged.

It should be noted that the matching described above occurs strictly only when the wave is transmitted parallel to the XX axis. However, the distance and susceptance vary with incidence and the effects of these variations tend to compensate each other in such a way that the modulator's behavior remains satisfactory; by way of example, using the previous values, a standing wave rate less than 1.4 can be obtained for an incident wave within a 120° cone angle.

Outside the modulator bandwidth the modulator becomes reflective during one of its state (the conducting state for low frequencies or the blocked state for high frequencies) and remains matched for its other state. The result is that an incident microwave is reflected, depending on the modulator state, either by the first modulator panel, or (partially) by the antenna of the equipment with a differential phase shift between these two situations mainly due to the difference the wave has covered in the two cases. Therefore, the result in this case is also a phase modulation corresponding to the frequency of switching between the two modulator states. The experimental phase-shift values obtained were no longer in the 180° range but are still about 120°.

The above description is given as a non-limitative example. For example, the differential phase shift imposed by the modulator $M_E$ does not have to be $\pi/2$ but may have a lower value. Experimentally, it has been observed that the effect on attenuation and decharacterization of the radar echo of the equipment for an external radar beam can be considered satisfactory for phase shifts $\phi_o$ in the 50° range. It is on this basis that the description contains one modulator $M_E$ placed in front of the equipment E, but it is equally possible to place several independently-controlled $M_E$-type modulators alongside the first one; by applying either the same modulation law, phase-shifted in relation to time, or different laws, to the various modulators, a deflection or, more generally, a spatial dispersion of the reflected wave is thus obtained.

What is claimed is:

1. A protection system for electronic equipment, said equipment having a surface able to transmit or receive a microwave and being equipped with transmitting and/or receiving means, connected to said surface, said system comprising:

a first phase modulation means, placed in front of said surface and which can be controlled to apply a first phase shift to said microwave;

a second phase modulation means, which can be controlled to apply a second phase shift opposite to said first phase shift, to the signals exchanged by said surface and the transmitting and/or receiving means.

2. A system according to claim 1, wherein said first phase modulation means comprises means for shifting the phase of the microwave by substantially $\pi/2$.

3. A system according to claim 1, wherein said first phase modulation means includes means for shifting the phase of said microwave; and said second phase modulation means includes means for shifting the phase of the exchanged signals outside the transmitting period of said equipment.

4. A system according to claim 2, wherein said first phase modulation means includes means for shifting the phase of said microwave; and said second phase modulation means includes means for shifting the phase of the exchanged signals during equipment transmitting and receiving periods.

5. A system according to claim 1, wherein said first means comprises a plurality of n panels, substantially parallel to each other and substantially equidistant, each panel comprising at least one network of semiconducting elements placed in a series of lines and having a conducting state and a non conducting state, the electrical and geometrical characteristics of the panels being such that in a first of said states of the semiconducting elements, the first panel has a susceptance equal to B; each of the following panels have a susceptance equal to 2B; and the last panel has a susceptance equal to B.

6. A system according to claim 5, wherein each panel has preselected electrical and geometrical characteristics; and in the other of said states of the semiconducting elements, each panel has zero susceptance.

7. A system according to claim 5, wherein the susceptance B of the first panel is given by the expression $$B = 2 \tan(\phi_o 1/(n+1))$$

where $\phi_o$ is said phase shift.

8. A system according to claim 5, wherein each panel comprises a second semiconductor network, positioned in a series of columns substantially perpendicular to said first series of lines.

9. A system according to claim 5, wherein the number n is equal to 3.

10. A system according to claim 9, wherein the susceptance B is substantially equal to 0.8.

11. A system according to claims 5, wherein said semiconducting elements are diodes.

12. A system according to claim 1, wherein said first phase modulation means surround the whole equipment.

13. A system according to claim 1, further comprising one or several means analogous to said first means, positioned close to the latter and controlled independently, to ensure spatial dispersion of said microwave.

* * * * *